H. W. BARGER.
COMBINATION POWER AND STEERING KNUCKLE.
APPLICATION FILED FEB. 14, 1910.
982,117.
Patented Jan. 17, 1911.
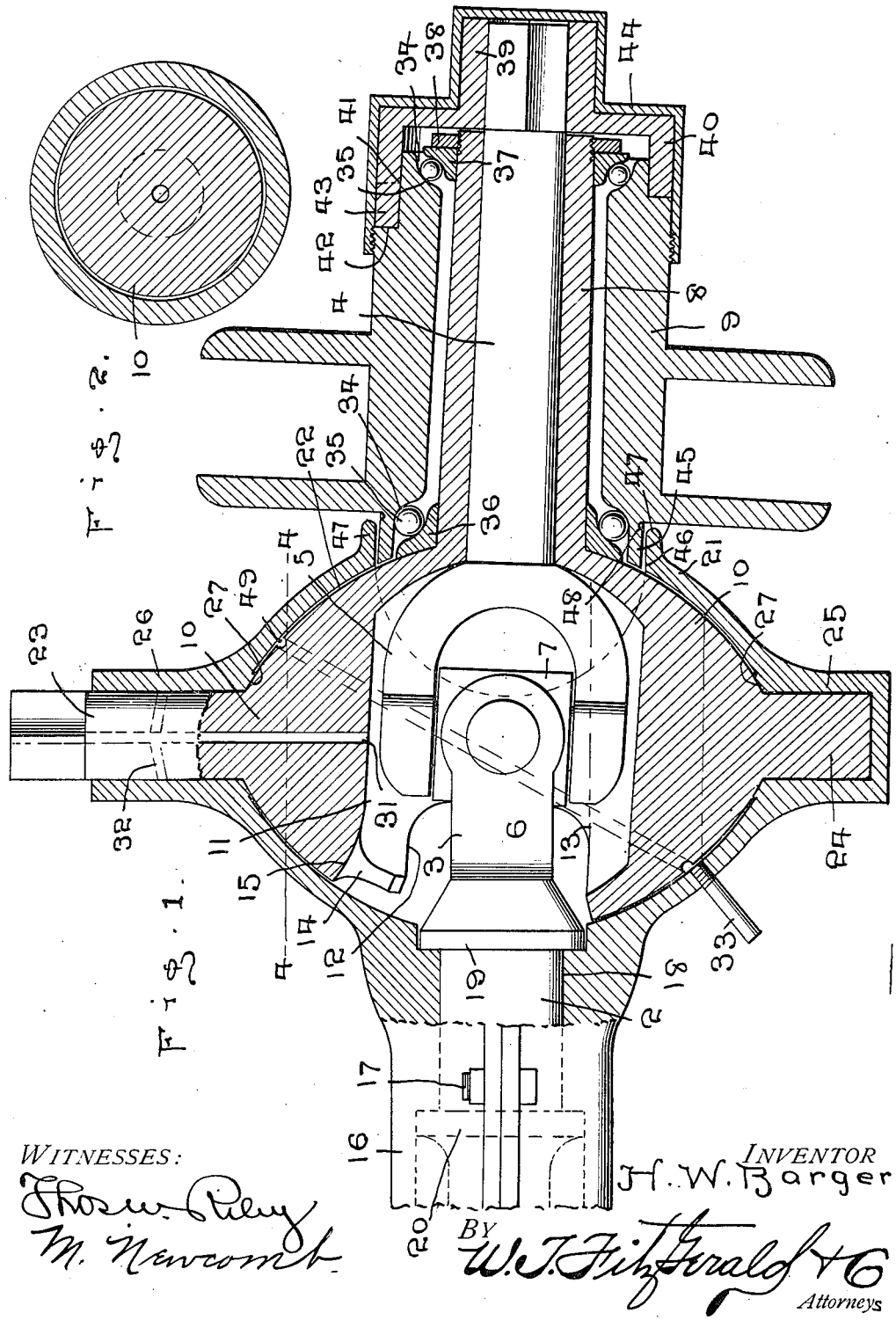

UNITED STATES PATENT OFFICE.

HENRY W. BARGER, OF TOLEDO, ILLINOIS.

COMBINATION POWER AND STEERING KNUCKLE.

982,117. Specification of Letters Patent. Patented Jan. 17, 1911.

Application filed February 14, 1910. Serial No. 543,710.

*To all whom it may concern:*

Be it known that I, HENRY W. BARGER, a citizen of the United States, residing at Toledo, in the county of Cumberland and State of Illinois, have invented certain new and useful Improvements in Combination Power and Steering Knuckles; and I do hereby declare the following to be a full, clear, and exact description of the invention, such as will enable others skilled in the art to which it appertains to make and use the same.

My invention relates to new and useful improvements in steering knuckles for four wheeled drives and my object is to provide means whereby both the front and rear wheels of a vehicle may be propelled.

A further object is to provide means whereby the spindles carrying the forward wheels may be swung forwardly or rearwardly to guide the vehicle.

A further object is to provide a suitable pivot for the swinging portion of the spindle.

A further object is to provide an opening in the pivotal end of the swinging spindle to receive the knuckle connecting the sections of the axle.

A further object is to so arrange said opening as to provide an oil chamber therein.

A further object is to provide means for attaching the hub of the wheel to the end of the axle, whereby said wheel will be caused to rotate with the axle, while the spindle remains stationary.

A further object is to provide means for removing the accumulation of oil from the housing at the pivotal end of the spindle, and, A further object is to provide means for preventing endwise movement of the axle in its housing.

Other objects and advantages will be hereinafter referred to and more particularly pointed out in the specification and claims.

In the accompanying drawings which are made a part of this application, Figure 1 is a vertical sectional view through the wheel and steering mechanism therefor on an enlarged scale, and, Fig. 2 is a sectional view as seen on line 4—4 Fig. 3.

Referring to the drawings in which similar reference numerals designate corresponding parts throughout the several views, 2 indicates the forward axle of a vehicle, said axle being formed in sections connected together by the usual or any preferred form of knuckle 3. In this instance, I have shown the spindle receiving end 4 of the axle 2 provided with a U-shaped terminal 5 at its inner end, while the end of the driving portion of the axle is provided with a similar terminal 6, one of said terminals being in a vertical position, while the opposite terminal is in a horizontal position, said terminals being pivotally secured to the usual form of swivel block 7.

Surrounding the end 4 of the axle is a sleeve 8 which serves as a spindle for the hub 9 of the wheel, said sleeve fitting loosely around the end 4, the inner end of said spindle terminating in a head 10, said head being preferably oval or substantially egg shaped.

At the longitudinal center of the head 10 is a cavity 11 in which the knuckle 3 is adapted to be seated, an oblong slot 12 being provided in the face of the head through which the knuckle may be introduced into the cavity. The cavity 11 extends above and below the edges of the slot 12 thereby forming an oil chamber 13 in the lower portion of the cavity and in order to permit the introduction of the knuckle into the cavity, the terminals 5 and 6 being wider than the height of the slot, a notch 14 is formed in the upper edge of the wall forming the slot, the roof 15 of the notch being preferably curved, as best shown in Fig. 3 of the drawings. In introducing the knuckle into the cavity 11, the terminal 5 is turned at right angles to the position shown in Fig. 3 and the end 4 introduced into the sleeve 8, until the end of the terminal 6 engages the wall of the head adjacent the slot, when the outer end of the sleeve and end 4 of the axle are thrown upwardly, it being understood that the knuckle is inserted within said cavity before the socket from the two-part casing has been applied to the head. This operation will position the upper portion of the terminal 6 in the notch 14, when by moving the sleeve farther on to the end 4 of the axle, the terminal 5 will be moved within the cavity sufficiently to permit the axle to be again rotated, when by turning the axle until the terminal 6 is in a horizontal position, the entire knuckle will readily enter the cavity. The sleeve and outer end 4 of the axle is then lowered to its proper position, which will throw the lower edge of the terminals when in a horizontal position into the oil chamber at each revolution of the knuckle and as said chamber is filled with oil to the lower edge of the slot 12, the knuckle will be thoroughly lubricated at all times.

The axle 2 is surrounded by a two-part casing 16, which casing entirely surrounds the axle and the sections thereof are secured together in any preferred manner, as by means of bolts 17, the casing adjacent its ends being provided with an interior collar 18 which fits between shoulders 19 and 20 on the axle, said shoulders and collar preventing longitudinal movement of the axle. The ends of the casing 16 terminate in oval shaped sockets 21, in which the head 10 fits, the diameter of the head being slightly less than the interior diameter of the socket, whereby a space 22 will be formed and as the oil entering said space will form a perfect seal, dust, etc., will be prevented from entering the cavity 11, whereby undue wear would be occasioned.

The upper and lower ends of the head 10 are provided with stems 23 and 24 respectively, the stem 24 being entered into a tubular bearing box 25 formed integral with the lower section of the socket 21, while the stem 23 projects upwardly through a tubular extension 26 on the upper section of the socket 21, said stem 23 projecting above the extension 26. These stems serve as pivots for the head and sleeve to which it is attached and in order to retain the head spaced from the wall of the socket, the portions of the socket immediately surrounding the stems 23 and 24 are extended inwardly the distance between the head and socket, said inwardly extending portions forming bearing points 27 and by hardening said bearing points in the usual manner, a firm bearing surface for the head is provided. The projecting end of the stem 23 is preferably square in cross section and is adapted to receive the end of an arm from the usual or any preferred form of steering mechanism, by means of which the swinging end of the axle may be moved forwardly or rearwardly to guide the vehicle.

Oil is introduced into the cavity 11 and around the head 10 by passing oil through the upper end thereof 23, said stem having a port 31 extending from the upper end of the stem to the top of the cavity 11 said stem being also provided with auxiliary ports 32 through which the oil is conveyed to the outer surface of said stem.

The lower section of the socket 21 is provided with a spout 33 through which the oil may discharge from the socket, said spout being placed at any convenient point, near the lower end of the head, whereby only the used oil will be removed from the socket and by extending the spout, as shown, the oil will be prevented from coming in contact with the wheel or parts of the hub, thus obviating the possibility of collecting dust on any part of the vehicle.

The hub 9 is extended loosely around the sleeve 8 and is provided at its opposite ends with races 34 in which are positioned bearing balls 35, the balls at the inner end of the hub engaging a cone 36 and the balls at the outer end of the hub engaging a cone 37, the cone 36 being positioned around the sleeve at its junction with the head, while the cone 37 may be adjusted longitudinally of the sleeve to compensate for any wear that may occur, a locking collar 38 being threaded on to the end of the sleeve 8 and adapted to hold the cone 37 in its adjusted position.

The section 4 of the axle projects beyond the end of the sleeve 8 and is preferably square in cross section to receive the square portion of a nut 39, the peripheral edge of the nut having a laterally extending flange 40 thereon, which engages a circumferential recess 41 on the end of the hub and by providing seats 42 at intervals in the hub into which are adapted to project tongues 43 around the edge of the flange 40, said nut will be held against independent rotation of the wheel, while the square end of the axle will cause the nut and wheel to rotate with the axle.

A dust proof cap 44 is introduced over the nut 39 and is interiorly threaded at its free end to engage threads on the hub 9 and as the cap extends beyond the seats 42 at the ends of the hub, dirt, etc., will be prevented from entering at this point. The inner end of the hub 9 is provided with a band 45, which band projects into a slot 46 in the socket 21, a lip 47 being placed around the mouth of the slot, whereby said lip will overhang the band 45 to prevent dirt, etc., from entering the bearing at this point and to further guard against water entering the slot, a channel 48 is extended around the band 45 adjacent its junction with the hub and as said channel is positioned beyond the end of the lip 47, any water entering said channel will be prevented from working inwardly between the band and lip. The head 10 is also provided with a groove 49 which is placed in the outer face of the head and extends at an angle to the vertical axis of the head, the upper end of the groove being at some distance from the stem 23 and on that side adjacent the sleeve 8, while the opposite end of the groove is directed to the opposite side of the head and at some distance from the stem 24, said lower end terminating preferably adjacent to the opening in the spout 33. The object of the groove 49 is to prevent the oil from descending over that portion of the head adjacent the sleeve 8, thereby preventing a discharge of the oil through the slot 46. In this manner, the stem 23 and the bearing point 27 at the upper end of the head will be thoroughly lubricated as will likewise the stem 24 and its bearing point, as a sufficient amount of the oil will collect in the lower portion of the socket 21 to thoroughly lubricate the stem 24.

It will thus be seen that I have provided a very cheap and economical form of means for driving the forward wheels of a vehicle and at the same time rendering the device strong and durable. It will likewise be seen that the bearing parts of the device are substantially dirt proof. It will likewise be seen that by forming an oval head and mounting the same in the oval socket, should the bearing stems break, the shape of the head and its socket will hold the sleeve and wheel from swinging upwardly or downwardly, thus maintaining the wheel in running position until such time as repairs can be made. It will likewise be seen that by introducing the knuckle into the head in the manner shown, a small cavity can be provided for the knuckle and an oil chamber formed at the same time. And it will likewise be seen that by placing the oil spout for the discharge of the oil from the socket, substantially at the point shown, the waste oil will be prevented from coming in contact with the wheels of the vehicle.

What I claim is:

1. In a device of the character described, the combination with an axle formed in sections and knuckles securing said sections together; of a two-part casing terminating at its ends in sockets, a head formed of one piece and fitting each socket, said head having a sleeve loosely surrounding one portion of said axle, means to pivotally mount said head within the sockets, said head having a cavity therein to receive said knuckles and also provided with a slot forming the entrance to said cavity, the height of the slot being less than that of the cavity and the knuckles, and means whereby said knuckles are permitted to be introduced in said cavity.

2. In a device of the class described, the combination with a swinging spindle, a head at one end of said spindle, said head having a cavity therein and a slot communicating with said cavity, the height of said slot being less than the height of the cavity to form an oil chamber, the wall forming the upper edge of the slot having a notch therein and pivotal means for the upper and lower ends of said head, of an axle extending through said spindle, said axle being formed in sections and a knuckle connecting said sections, said knuckle being adapted to enter and rotate in said cavity.

3. In a device of the class described, the combination with a hollow spindle, a head at one end of said spindle, said head having a cavity therein and a slot communicating with said cavity, said slot being of less height than said cavity, the upper edge of said slot having a notch therein, of a socket surrounding said head, means to pivotally mount said head in the socket, a wheel rotatably mounted on said spindle, an axle formed in sections extending through said cavity and spindle, a knuckle of greater height than said slot connecting said sections together and adapted to rotate in said cavity and means to connect the axle to the wheel, whereby said wheel will be rotated with the axle.

4. In a device of the character described, the combination with a two-part casing terminating in a socket, said socket having a slot therein; of a tubular spindle extending through said slot and having a head at one end thereof pivotally mounted within said socket, said head being slightly spaced from the inner walls of said socket and having a cavity in the central portion thereof, means to supply a lubricant to the cavity and the space between the socket and head, said head being also provided with a groove extending diagonally around the face thereof, the upper extremity of said groove being disposed at a point above the slot in said socket, and a drain spout on said socket at a point adjacent the lower extremity of said groove, whereby surplus oil will be removed.

5. In a device of the character described, the combination with a casing having a socket at one end thereof and a tubular spindle having an enlarged head thereon, said head being pivotally mounted in said socket and provided with a cavity, said head being also provided with a slot communicating with and of less height than said cavity, the upper wall of said slot being provided with a notch and the upper wall of said notch being convexed; of an axle formed in sections extending through said casing and spindle, and a knuckle connecting said sections together and adapted to rotate within said cavity, the height of said knuckle being greater than the height of said slot.

In testimony whereof I have signed my name to this specification in the presence of two subscribing witnesses.

HENRY W. BARGER.

Witnesses:
STIRLING P. REED, Jr.,
JOEL McANALLY.